United States Patent [19]

McDaniel et al.

[11] 4,238,369

[45] Dec. 9, 1980

[54] CHROMIUM-SILICA CATALYSTS BY HYDROTHERMAL TREATING

[75] Inventors: Max P. McDaniel; Melvin B. Welch; Alonzo G. Kitchen, all of Bartlesville, Okla.

[73] Assignee: Phillips Petroleum Company, Bartlesville, Okla.

[21] Appl. No.: 30,599

[22] Filed: Apr. 16, 1979

[51] Int. Cl.$^3$ .......................... B01J 23/26; B01J 21/08
[52] U.S. Cl. ..................................... 252/458; 526/106
[58] Field of Search ......................... 252/458; 526/106

[56] References Cited

U.S. PATENT DOCUMENTS

| | | | |
|---|---|---|---|
| 2,951,816 | 9/1960 | Hogan et al. | 252/467 |
| 3,288,767 | 11/1966 | Hogan et al. | 526/106 |
| 3,622,521 | 11/1971 | Hogan | 252/458 X |
| 3,887,494 | 6/1975 | Dietz | 252/458 X |
| 3,950,316 | 4/1976 | Witt | 526/106 |

*Primary Examiner*—Carl F. Dees

[57] ABSTRACT

A catalyst composition of a chromium compound supported on a silica-containing substrate is prepared by contacting the silica-containing substrate with a gaseous carrier containing water vapor at a temperature in the range above about 1100° F. to about 2000° F. for a time sufficient to effect a broadening of molecular weight distribution of polymers produced using the catalyst. In further embodiments, the catalyst prepared by the method described above and a method for preparing polymers of ethylene using the catalyst prepared by the method described above.

9 Claims, No Drawings

CHROMIUM-SILICA CATALYSTS BY HYDROTHERMAL TREATING

BACKGROUND OF THE INVENTION

This invention relates to the preparation of polymers of ethylene. In one of its aspects this invention relates to the preparation of polymerization catalysts. In another of its aspects this invention relates to the treatment of a catalyst support substrate containing silica to effect a change in the polymer produced using the substrate as part of a polymerization catalyst.

To control the shear response of polyolefins by the treatment of chromium oxide containing catalyst used in the preparation of the polymers is described in U.S. Pat. No. 3,288,767. In that process it was determined that the "shear response"—the response of shear rate to changes in shear stress—of a molten polyolefin could be affected by a hydrothermal treatment of a catalyst comprising microspheroidal silica or silica-alumina on which there had been distributed about 1-5 weight percent of an oxide of chromium at least part of which is in a hexavalent form. The hydrothermal treatment applied during the activation of the catalyst at temperatures ranging up to 2000° F. was used to achieve an influence on the shear response of polymers produced with the influence increasing with decreasing water vapor content as the water vapor concentration was varied in the chromium oxide catalyst activation air during the maximum temperature heating stage. It has now been determined that hydrothermal treatment of the silica-containing substrate itself affects the production of polymers produced using catalyst of chromium oxide supported on the treated silica-containing substrates to increase the shear response in comparison to polymers made with untreated silica-containing substrates.

It is therefore an object of this invention to provide a catalyst system which produces polymers that exhibit increased shear response in comparison to polymers made with untreated catalysts. It is another object of this invention to provide a process in which a catalyst system is hyrothermally treated and to provide a catalyst produced thereby. It is still another object to provide a polymerization process using the catalyst produced using the hydrothermal treatment.

Other aspects, objects and the various advantages of this invention will become apparent upon reading the specification and the appended claims.

STATEMENT OF THE INVENTION

According to this invention a method for preparing a catalyst composition containing a chromium compound supported on a silica-containing substrate is provided. In this method the silica-containing substrate is contacted with a gaseous carrier containing water vapor with a contact taking place at an elevated temperature in a range above 1100° F. for a time sufficient to effect a broadening of molecular weight distribution of polymers produced using the catalyst which would cause the polymers to exhibit increased shear response in comparison to polymers made with untreated catalyst.

The process can be used to hydrothermally treat either the silica-containing substrate itself or the total catalyst, e.g., the support substrate plus the added chromium compound. The hydrothermal treatment given the catalyst can be carried out prior to activation of the catalysts or it can be conveniently given as part of the activation process.

The treatment is carried out at temperatures in a range greater than about 1100° F. (590° C.) up to about 2000° F. (1100° C.), preferably at least about 1200° F. (650° C.) and most preferably at temperatures ranging from about 1300° to 1800° F. (705°–980° C.).

Following the exposure to moisture, the treated catalyst is heated in dry air at temperatures in the range cited above for from 0.5 to about 20 hours, cooled, and recovered to obtain the activated catalyst. In an alternative embodiment, following the moisture treatment the catalyst can be sequentially heated in a carbon monoxide environment and in an oxygen-containing environment as described in Ser. No. 857,553, filed Dec. 5, 1977, which is incorporated here by reference.

The supports contemplated in this invention are made up of particulate silica in admixture with from 0 up to about 20 weight percent of one or more metal oxides selected from among alumina, boria, thoria, titania and zirconia. The admixtures can be prepared by simple mixing of the particulate solids or by coprecipitation. As example of a silica-titania cogel prepared by coprecipitation is described in U.S. Pat. No. 3,887,494 incorporated here by reference. The reference describes a large pore material, the pore structure of the gel being preserved by azeotrope drying of the hydrogel in the presence of ethyl acetate.

By this invention conventional catalyst supports or bases can first be combined with a chromium-containing compound or compounds without regard to the water content of the support, the chromium-containing compound or compounds or the medium employed in depositing the chromium-containing compound or compounds on the support. In other words, this combining step is carried out in the presence of water, i.e., at least 2 weight percent water based on the weight of the chromium compound(s) being added to the support. The chromium-containing compound can be combined with the support in any conventional manner such as by mechanical mixing in water and the like. The support can be impregnated or refluxed with an aqueous solution or dispersion of any chromium compound which is at least in part hexavalent chromium oxide or can be converted at least in part to hexavalent chromium oxide by heating in the presence of molecular oxygen. The impregnated substrate is then dried before being subjected to the treatment of this invention.

If impregnation with chromium is carried out subsequent to the hydrothermal treatment of the substrate set forth in this invention, contact of chromium compound with the substrate must be made in the absence of water. A dry organic solvent containing sufficient chromium compound to obtain the desired concentration can be used in the impregnation. The solvent is then vaporized and the composite calcined in air to convert the chromium compound to chromium oxide.

Suitable compounds for impregnating the substrate include chromium trioxide, chromic nitrate, chromic acetate, chromic chloride, chromic sulfate, ammonium chromate, ammonium dichromate, other soluble salts of chromium, or organic chromium compounds, i.e., t-butylchromate and diarene chromium, such as dicumene chromium.

In making the catalyst of this invention, sufficient amounts of chromium-containing compound or compounds should be employed so that the final catalyst contains from about 0.1 to about 50, preferably from about 0.1 to about 10, weight percent, based on the weight of the final catalyst, chromium oxide calculated as chromium trioxide.

The invention is particularly applicable in the preparation of polyethylene and copolymers of ethylene in which combined ethylene is present in amounts greater than about 75 mole percent. Copolymers can be prepared from mixtures of ethylene, and one or more olefin monomers containing up to about 10 carbon atoms, such as propylene, 1-butene, 1-pentene, 1-hexene, 4-methyl-1-pentene, and the like as well as diolefin monomers containing up to about 8 carbon atoms such as butadiene and isoprene.

The catalysts of this invention can be employed in solution processes, particle form (slurry) processes and gas phase processes in a batchwise or continuous manner. However, particle form polymerization is the preferred mode of operation where the advantages of producing relatively high melt index polymers with broadened molecular weight distributions at moderate reactor temperatures is particularly evident.

Polymerization processes using the invention catalyst generally employ polymerization temperatures ranging from about 100° to 500° F. (38°–260° C.), reactor pressures ranging from about 100 to 700 psig (0.7–4.8 MPa) or higher and catalyst concentrations ranging from about 0.001 to 10 weight percent based on the weight of reactor contents.

The diluent used in particle form polymerization is generally a paraffin or cycloparaffin having from 3 to about 12 carbon atoms per molecule. Examples include propane, isobutane, n-butane, isopentane, cyclohexane, methylcyclohexane, isooctane, n-nonane, n-dodecane and the like. Hydrogen can be present during polymerization, if desired.

The temperatures employed will be such that substantially all of the polymer formed will be and remain in particulate form during the polymerization. When isobutane is used as diluent, for example, suitable temperatures range from about 150° to 233° F. (65°–112° C.). The particle form process is further described in U.S. Pat. No. 3,950,316 incorporated here by reference.

In contacting the catalyst supports and the supported catalysts with moisture, in the practice of this invention, the duration of treatment is sufficient to effect a positive change in catalyst behavior as evidenced by the broadening in molecular weight distribution of polymers produced by the invention catalysts. Generally, the treatment can last from about 0.5 hours to 24 hours.

The amount of water vapor present in the gases contacting the catalysts can range from about 0.5 to 5 volume percent and is generally about 2 to 4 volume percent. It can be provided by bubbling the gases through water prior to introducing the moistened gases to the treatment zone or activator. A convenient method is shown in U.S. Pat. No. 3,288,767.

EXAMPLE 1

A series of catalysts was treated in a laboratory size fluid bed glass activator 48 mm in diameter by employing 50 ml portions of each sample. The activator was heated at the rate of 350° C. per hour, in each run, until the desired treating temperature was reached. When moisture was added to the gas or gases employed it was added by bubbling the gas through water at about 25° C. The water vapor portion contributed a partial pressure of about 23 mm Hg in each such instance. The volume of total gas passing through the reactor was 40 liters per hour. Thus, in the runs where water vapor was employed, since the water vapor was calculated to provide about 3 volume percent of the total gas, the gaseous hourly space velocity of the water vapor relative to the catalyst was calculated to be about 24 volumes water vapor per volume catalyst per hour.

Ethylene was polymerized under particle form conditions by contact with each catalyst in the presence of an isobutane diluent at a nominal reactor pressure of 55 psig (3.8 MPa). Each run was conducted for a time sufficient to obtain a catalyst productivity of about 5,00 grams polyethylene per gram of catalyst.

The catalyst treating conditions and results obtained are given in Table 1.

Catalyst pore volumes are determined by the the Innis method using isopropanol. Analytical Chemistry, 28, 332–334 (1956).

Calculated productivities are based on grams polymer per grams catalyst.

Polymer melt index (MI) is determined according to ASTM D1238-65T, condition E and the values are corrected to a common productivity value of 5000 grams polymer.

High load melt index (HLMI) is determined according to ASTM D1238-65T, condition F. The HLMI/MI ratio is related to polymer molecular weight distribution; the higher the ratio, the broader the distribution.

TABLE 1

Ethylene Polymerization Over Treated Catalysts

| Run No. | Catalyst | Catalyst Treatment | Reactor Temp. °C. | Pore Volume cc/g | Surface Area m²/g | Calculated Productivity g/g | Polymer Melt Index | HLMI MI | Remarks |
|---|---|---|---|---|---|---|---|---|---|
| 1 | 1% Cr cogel[a] | (b) | 102 | —[c] | — | 5620 | 1.7 | 56 | control |
| 2 | 1% Cr cogel | (d) | 102 | — | — | 4380 | 1.7 | 59 | control |
| 3 | 1% Cr silica[e] | air, 816° C., 3 hours | 107 | — | — | 5140 | 0.39 | 82 | control |
| 4 | " | air, 816° C., 5 hours | 110 | 1.69 | 253 | 5340 | 1.7 | 42 | control |
| 5 | " | N₂ + H₂O, 871° C., 3 hours; air, 816° C., 2 hours | 107 | 1.19 | 166 | 5240 | 0.07 | 175 | invention |
| 6 | " | same as run 5 | 110 | 1.19 | 166 | 5180 | 0.24 | 102 | invention |
| 7 | 1% Cr cogel | air, 871° C., 5 hours | 102 | 2.35 | 400 | 5000 | 1.3 | 66 | control |
| 8 | " | same as run 7 | 107 | 2.35 | 400 | 5000 | 4.6 | 45 | control |
| 9 | " | N₂ + H₂, 871° C., 3 hours; air, 871° C., 1 hour | 102 | 2.26 | 319 | 4820 | 0.3 | 116 | invention |
| 10 | " | same as run 9 | 107 | 2.26 | 319 | 5980 | 1.6 | 53 | invention |
| 11 | 0.3% Cr Cogel[f] | air + H₂O, 871° C., 2.5 hours; air, | 102 | — | — | 4470 | 0.4 | 77 | invention |

TABLE 1-continued

Ethylene Polymerization Over Treated Catalysts

| Run No. | Catalyst | Catalyst Treatment | Treated Catalyst | | | | | | |
|---------|----------|--------------------|---|---|---|---|---|---|---|
| | | | Reactor Temp. °C. | Pore Volume cc/g | Surface Area m²/g | Calculated Productivity g/g | Polymer Melt Index | HLMI MI | Remarks |
| 12 | 0.3% Cr Cogel | 871° C., 2 hours same as run 11 | 107 | — | — | 4750 | 1.2 | 48 | invention |

[a] Coprecipitated silica-titania cogel containing about 2 weight percent titanium as $TiO_2$. 0.1 weight percent chromium as chromium oxide added to the cogel prior to drying.
[b] Heat in CO to 871° C. and hold 3 hours, flush with $N_2$ to remove CO and lower temperature to 427° C. Heat product in air at 427° C. for 2 hours.
[c] A dash signifies no determination was made.
[d] Heat in $N_2$ to 538° C., then in $N_2$ and $H_2O$ at 538° C. for 2 hours, raise temperature to 871° C. in CO and hold for 1 hour, flush with $N_2$ to remove CO and lower temperature to 760° C. and heat in air at 760° C. for 1 hour.
[e] Commercially obtained microspherical silica containing 1 weight percent chromium as chromium oxide.
[f] Similar to [a] except lower chromium content.

Previous work in ethylene particle form polymerization with supported chromium oxide catalysts has indicated that reactor temperature directly affects polymer melt index and the HLMI/MI ratio. As reactor temperature increases, for example, polymer melt index increases and HLMI/MI ratio decreases. In comparing polymer results it is therfore necessary to specify the reactor temperature employed as one parameter. Other parameters include catalyst activation temperature and nature of the catalyst itself which both influence the melt index of ethylene polymers prepared over them. Thus polymer melt index tends to increase as the catalyst activation temperature increases and the melt index capability of catalysts consisting of chromium oxide supported in silica-titania cogel is generally higher than when silica is the support used.

Control run 1 shows typical polymer results obtained with the polymerization conditions employed and the catalyst activation procedure used. When another portion of the same catalyst of run 1 is sequentially treated in moist nitrogen at 538° C. (1000° F.), dry CO at 871° C. (1600° F.) and in dry air at 760° C. (1400° F.) and used to polymerize ethylene at the same conditions employed in control run 1, the results of control run 2 show that the polymer melt index and HLMI/MI ratio in unchanged. U.S. Pat. No. 3,288,767 discloses that a hydrothermal treatment given a supported chromium oxide catalyst near 1000° F. yields a catalyst which when employed in solution form ethylene polymerization narrows the molecular weight distribution of the produced polymer (reduces the HLMI/MI ratio). The polymer properties shown in runs 1 and 2 are essentially identical, hence it appears that the treatment shown in the reference is applicable primarily to solution form polymerization.

Control runs 3 and 4 and 7 and 8 show typical polymer results obtained with chromium oxide-silica catalysts and with chromium oxide-silica/titania catalysts in which all catalysts were conventionally activated in dry air. The effects of increased polymer melt index with increased reactor temperature is shown as well as the increased melt index capability of the chromium oxide-silica/titania catalyst. All of the polymers made, however, exhibit relatively low HLMI/MI ratios indicating a rather narrow molecular weight distribution.

The results of invention runs 5 and 6 with corresponding control runs 3 and 4 indicate that the moist treatment given the silica-chromium oxide catalysts decreases their surface area and the pore volume to some extent. Such treatment somewhat decreases the melt index capability of the catalysts but the HLMI/MI ratios of the polymers formed are much higher which is indicative of broadening of the molecular weight distribution of the polymers.

In comparing the results obtained in invention runs 10, 11 with control runs 7, 8 it is seen that the moist treatment given the catalysts which contain titanium yields results similar in nature to those described for the silica-chromium oxide catalyst. That is, the moist treatment yields catalysts with a somewhat reduced melt index capability but polymers produced over them have broadened molecular weight distribution as indicated by the unusually high HLMI/MI ratios.

Invention runs 11, 12 which utilize less chromium in the catalyst than the others in this series suggest that the moist treatment is effective with such catalysts, also.

EXAMPLE 2

A series of catalyst supports (catalyst precursors) in the absence of chromium was treated in the manner described for the catalysts in Example 1. In each instance, 50 ml portions of a coprecipitated silica-titania cogel containing about 2 weight percent titanium as $TiO_2$ was employed. Following the treatment afforded each support, the product after recovery was impregnated in a dry n-hexane slurry with sufficient diarene chromium to add 0.5 weight percent chromium as dicumene chromium. The solvent is then vaporized and the composite calcined in air to convert the chromium compound into chromium oxide.

Ethylene was polymerized in contact with each catalyst as described before.

The catalyst precursor treatments given and the results obtained with catalysts prepared from them are given in Table 2.

TABLE 2

Ethylene Polymerization Over Catalysts Prepared From Treated Precursors

| Run No. | Chromium Addition | Catalyst Precursor Treatment | Reactor Temp., °C. | Calculated Catalyst Productivity | Polymer MI | HLMI MI | Remarks |
|---------|-------------------|------------------------------|--------------------|-----|-----|-----|---------|
| 13 | [a] | air, 871° C., 5 hours | 102 | 4810 | 0.74 | 61 | control |
| 14 | [a] | same as run 13 | 104 | 5210 | 1.3 | 46 | control |
| 15 | [b] | air + $H_2O$, 871° C., 3 hours | 102 | 4840 | 1.3 | 91 | invention |
| 16 | [b] | air, 871° C., 2 hours same as run 15 | 107 | 5430 | 3.4 | 52 | invention |

TABLE 2-continued

Ethylene Polymerization Over Catalysts Prepared From Treated Precursors

| Run No. | Chromium Addition | Catalyst Precursor Treatment | Reactor Temp., C.° | Calculated Catalyst Productivity | Polymer MI | HLMI MI | Remarks |
|---|---|---|---|---|---|---|---|
| 17 | (b) | air + H$_2$O, 871° C., 3 hours | 102 | 5000 | 0.6 | 119 | invention(c) |
| 18 | (b) | air, 871° C., 1 hour same as run 17 | 107 | 4440 | 1.4 | 56 | invention(c) | notes:
(a)Treated support after recovery was impregnated with 0.5 weight percent chromium, anhydrously as a n-hexane solution of dicumene chromium, dried and composite heated in air for 2 hours at 316° C. (600° F.).
(b)Treated support after recovery was impregnated as in (a), dried and composite heated in air for 1 hour at 316° C.
(c)Catalyst pore volume was 2.40 ml/g and surface area was 345 m$^2$/g. These properties for the other catalysts were not determined.

The results presented in Table 2 demonstrate that the effect of the hydrothermal treatment is on the silica support and not upon the chromium oxide associated with that support. In the invention run, each silica-titania cogel support is first hydrothermally treated and only afterwards impregnated with a chromium compound which is subsequently converted into chromium oxide. Thus, control runs 13, 14 disclose the usual relatively small HLMI/MI ratios for the corresponding melt index value of the polymers produced at the polymerization conditions and catalyst activation conditions employed. Invention runs 15–18 show that the moisture treatment given the catalyst precursors, which are subsequently converted into catalysts, results in catalysts which produce polymers with unusually high HLMI/MI ratios.

We claim:

1. A method for preparing a catalyst composition comprising a chromium compound supported on a silica-containing substrate said process comprising contacting (1) said silica-containing substrate previously impregnated with a chromium compound with (2) a gaseous carrier containing a finite amount, up to about 5 volume percent of water vapor at a temperature in the range above about 1100° F. for a time sufficient to effect a broadening of molecular weight distribution of polymers produced under particle form polymerization conditions using the catalyst.

2. A method for preparing a catalyst composition comprising a chromium compound supported on a silica-containing substrate said process comprising contacting (1) said silica-containing substrate with (2) a gaseous carrier containing a finite amount, up to about 5 volume percent of water vapor at a temperature in the range of about 1300° F. to about 1800° F. for a time sufficient to effect a broadening of molecular weight distribution of the polymers produced under particle form polymerization conditions using the catalyst wherein the substrate is impregnated with said chromium compound subsequent to the contact of the substrate with water vapor.

3. A method of claim 1 or 2 wherein the treatment time is in the range of about 0.5 to about 24 hours.

4. A method of claim 2 wherein subsequent to impregnation, the chromium-containing catalyst is treated by contact with at least one dry gas in a temperature range above about 1100° F. for about 0.5 to about 20 hours and recovered as activated catalysts.

5. A method of claim 2 wherein the chromium-containing catalyst is treated by contact with at least one dry gas in a temperature range above about 1100° F. for about 0.5 to about 20 hours and recovered as activated catalyst.

6. A method of claim 1 or 2 wherein silica-containing substrate comprises silica with from 0 up to about 20 weight percent of alumina, boria, thoria, titania, zirconia, or mixtures thereof.

7. A catalyst prepared by the method of claim 1 or 2.

8. A catalyst prepared by the method of claim 5.

9. A catalyst prepared by the method of claim 5.

* * * * *

UNITED STATES PATENT AND TRADEMARK OFFICE
CERTIFICATE OF CORRECTION

PATENT NO. : 4,238,369
DATED : December 9, 1980
INVENTOR(S) : Max P. McDaniel et al It is certified that error appears in the above-identified patent and that said Letters Patent are hereby corrected as shown below:

Column 8, line 42, delete "5" and insert therefor --- 4 ---.

Signed and Sealed this

Fourteenth Day of April 1981

[SEAL]

Attest:

RENE D. TEGTMEYER

Attesting Officer          Acting Commissioner of Patents and Trademarks

Disclaimer 4,238,369.—*Max P. McDaniel, Melvin B. Welch* and *Alonzo G. Kitchen,* Bartlesville, Okla. CHROMIUM-SILICA CATALYSTS BY HYDROTHERMAL TREATING. Patent dated Dec. 9, 1980. Disclaimer filed July 6, 1983, by the assignee, *Phillips Petroleum Co.*

Hereby enters this disclaimer to all claims of said patent.

[*Official Gazette August 30, 1983.*]